Aug. 7, 1956          F. L. GALLOWAY          2,757,393
DIE FOR CUTTING THREADS ON NON-METALLIC ARTICLES
Filed July 2, 1954
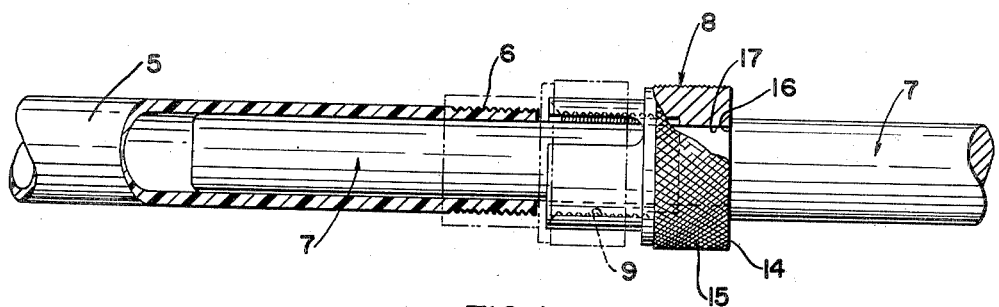
FIG. 1
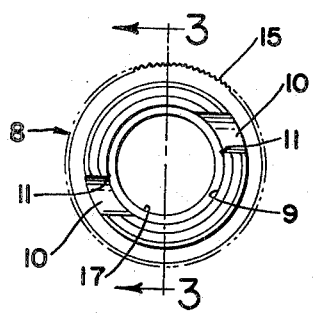
FIG. 2
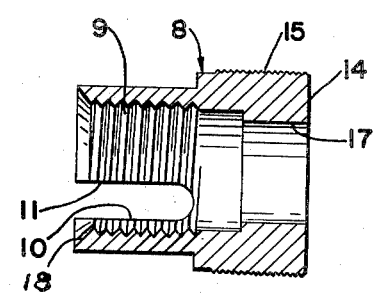
FIG. 3
FIG. 4
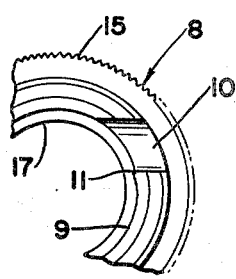
FIG. 5
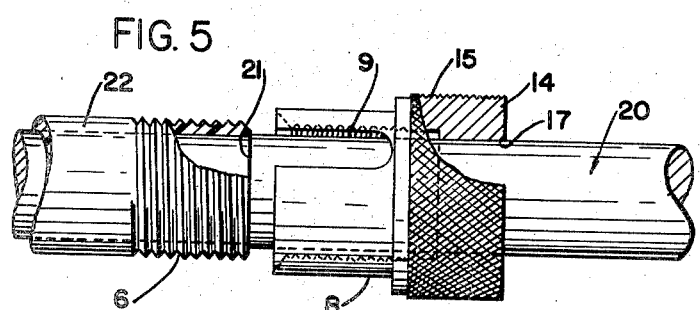
INVENTOR.
FRANCIS L. GALLOWAY
BY
ATTORNEY

United States Patent Office 2,757,393
Patented Aug. 7, 1956

2,757,393

DIE FOR CUTTING THREADS ON NON-METALLIC ARTICLES

Francis L. Galloway, Cuyahoga Falls, Ohio

Application July 2, 1954, Serial No. 441,096

5 Claims. (Cl. 10—118)

This invention relates to a die and die assembly for manually producing external threads on a plastic hose or pipe, and the method of producing the threads. The equipment and method are designed more particularly for producing threads on an extruded hose composed entirely of a vinyl or like composition which has no fabric in its structure. Such hose is relatively soft and collapsible.

The die assembly includes the die and a mandrel. The die is made of metal and a portion of the outer surface is preferably shaped to facilitate relative manual rotation between the die and the mandrel. The die may be held against rotation and the mandrel rotated, or the mandrel may be held stationary while the die is manually rotated around it, but ordinarily both the die and mandrel will be manually rotated in the opposite directions.

A portion of the mandrel fits into the hose and this is cylindrical in cross section and only slightly smaller in diameter than the inside diameter of the hose. The mandrel extends through the die which serves as a bearing for it. The portion of the mandrel which projects from the die may be of the same or a different diameter from the portion designed to fit within the hose; it may be cylindrical or may be shaped to facilitate its manual rotation.

Although ordinarily the die will be used with the mandrel, it is possible to thread the hose with the die without using the mandrel.

The invention will be further described in connection with the accompanying drawings.

Fig. 1 is a side elevation of the die assembly and one end of a length of hose, partly broken away. The die is shown in full lines in the position it occupies at the start of cutting the threads on the hose, and its location when the cutting operation is completed is shown in dot-dash lines.

Fig. 2 is an end view of the die, looking at the cutting end.

Fig. 3 is a section on the line 3—3 of Fig. 2.

Fig. 4 is an enlarged detail showing the cutting edge of the die.

Fig. 5 is a view in elevation illustrating a modified type of mandrel with a die and hose of larger diameter.

In Fig. 1 the hose 5 is shown partly in section. The end is threaded at 6. The mandrel 7 may be composed of wood, plastic or the like. One end fits into the end of the hose which is to be threaded. This end is but slightly smaller in diameter than the diameter of the hose so that it prevents collapse of the hose without interfering with the relative movement of the hose and the mandrel.

The die 8 is threaded internally at 9, and two narrow flutes 10 provide cutting edges 11. The flutes preferably extend the depth of the threads, and the threads preferably extend away from the chamfer a distance at least equal to the major portion of the diameter of the threaded wall. Each cutting edge 11 is deformed sharply inwardly as by the application of pressure to the outer surface of the die. This is best shown in Fig. 4. To provide a sharp cutting edge, the flutes are not radial but are parallel to one another on opposite sides of the center of the die. In this way the plane of the leading edge is enough forward of the center of the die with respect to the intended direction of rotation to give a cutting angle. For hose no larger than one inch in diameter two oppositely located cutting edges, as shown, suffice. The long lands between the flutes prevent the buckling of the hose during the cutting operation and insure the formation of perfect threads. They trail cylindrically back from the cutting edge for a distance at least equal to an arc of 90 degrees and constitute a threaded guide which is substantially complementary to the threads cut into the hose when the hose is rounded out. And opposite most of the extent of each land is a cylindrical portion of the die wall which also constitutes a threaded guide which is substantially complementary to the threads cut into the hose when rounded out and extends for a distance of at least 90 degrees. For larger hose three cutting edges may be provided, and these are preferably spaced uniformly around the die in order to provide uniform cutting resistance to the relative rotation of the die and hose. One cutting edge may be used, but does not provide a balanced operation.

In the die illustrated, the outer end 14 is enlarged somewhat and its surface is knurled at 15. This gives a better grip for manual rotation of the die and hose, relatively to one another. The shoulder 16 on the mandrel abuts the outer end of the die so that the mandrel will not slip into the hose.

In order to thread the hose, the smaller end of the mandrel is inserted through the opening 17 in the outer end of the die. This opening is preferably only slightly larger in diameter than the diameter of the portion of the mandrel which extends through it. The opening is sufficiently long to hold the mandrel concentric with the die. Thus the axis of the threads coincides with the axis of the hose. The opening 17 serves as a bearing for the mandrel. The inner edge of the inner end of the die is chamfered or otherwise relieved at 18 to receive the end of the hose. The end of the hose 5 is fed over the mandrel until its end is adjacent the chamfered inner end of the die. Then grasping the hose with one hand (the left hand) and squeezing it against the mandrel, and grasping the knurled portion of the die with the other hand (the right hand), the die is rotated relatively to the hose by twisting the hands with respect to one another. At the same time, the hose is pushed against and into the die. The mandrel prevents the collapse of the hose and keeps the hose and die concentric to one another. In forming the threads, the two hands will be rotated relatively to one another to the greatest convenient extent, and then a new grip will be taken on the die, or on the hose, or on both, and the rotative movement repeated as often as necessary.

An experienced operator does not need the mandrel. He can feed the hose into the die manually, keeping the two concentric, without using the mandrel.

Mandrels of different designs may be used. Thus, in Fig. 5 there is no shoulder on the mandrel 20 at the outer end of the die, but there is a shoulder 21 against which the end of the hose 22 abuts. With such a mandrel the end of the hose is located somewhat more firmly on the mandrel than if there were no shoulder, and this facilitates the threading operation. The mandrel may be solid or hollow. It may be of uniform diameter throughout. It may be of wood, metal, or plastic.

The outer surface of the die may be of substantially uniform size throughout its length, or one portion may be made larger or smaller (depending upon the size of the hose which is to be threaded) in order to make it most easily grasped by a man's hand.

The invention is defined in the appended claims.

What I claim is:

1. An annular die for threading plastic hose externally, which die is chamfered at its free end and provided with internal threads adjacent the edge of the chamfer, at least one flute extending from the free end of the die across the chamfer and threads, the ends of at least those threads along the leading edge of the flute adjacent the chamfer being deflected sharply inwardly, with the plane of the leading edge enough forward of the center of the die with respect to the intended direction of rotation to give the edge a cutting angle and form a cutting edge, with the internally threaded die wall trailing said cutting edge cylindrically through an angle of at least 90 degrees and constituting a guide and support substantially complementary to the threads cut into the hose when rounded out, there being opposite most of said guide an internally threaded wall of the die which is itself a guide and support and which over an expanse of at least 90 degrees is substantially complementary to the threads cut into the hose when rounded out.

2. The die of claim 1 in which said flute extends across substantially all of the threads.

3. The die of claim 1 in which the distance which the threads extend along the wall of the die away from the chamfer is at least equal to the major portion of the diameter of the threaded wall of the die and said flute is equally long.

4. The die of claim 1 in which there are two flutes diametrically opposite one another each having a cutting edge as defined.

5. The die of claim 2 in which in the end opposite the chamfered end there is a round opening concentric with the die and substantially the size of the inside of the hose, which opening is adapted to accommodate a mandrel to support said hose.

References Cited in the file of this patent

UNITED STATES PATENTS

| | | |
|---|---|---|
| 915,325 | Bartol | Mar. 16, 1909 |
| 1,076,868 | Codling | Oct. 28, 1913 |
| 1,125,784 | Wells | Jan. 19, 1915 |
| 1,312,345 | Newman | Aug. 5, 1919 |
| 1,588,606 | Oden | June 15, 1926 |
| 2,028,437 | Carliss | Jan. 21, 1936 |
| 2,043,353 | Koonz et al. | June 9, 1936 |
| 2,054,745 | Goob | Sept. 15, 1936 |

FOREIGN PATENTS

| | | |
|---|---|---|
| 29,849 | Switzerland | Oct. 14, 1903 |
| 186,743 | Great Britain | Oct. 12, 1922 |